United States Patent [19]

Martinic

[11] 4,250,795
[45] Feb. 17, 1981

[54] PRESSURE LIMITER FOR HYDRAULIC BRAKE BOOSTER

[75] Inventor: Jack Martinic, South Bend, Ind.

[73] Assignee: The Bendix Corporation, Southfield, Mich.

[21] Appl. No.: 918,631

[22] Filed: Jun. 23, 1978

[51] Int. Cl.³ .................... F15B 11/08; F15B 13/042
[52] U.S. Cl. ........................................ 91/445; 91/447; 91/448; 91/451; 137/596.12; 137/625.68
[58] Field of Search ................. 91/446, 445, 447, 448, 91/468, 451, 452, 433, 449; 137/596.12, 596.13, 625.68, 505.18; 60/468, 494

[56] References Cited

U.S. PATENT DOCUMENTS

| 2,701,552 | 2/1955 | Light | 91/445 X |
| 2,954,052 | 9/1960 | Krehbiel | 91/451 X |
| 3,426,790 | 2/1969 | Dey | 137/505.18 |
| 3,576,194 | 4/1971 | Christensen | 137/505.18 |
| 3,603,209 | 9/1971 | MacDuff et al. | 91/452 X |
| 3,724,332 | 4/1973 | Bach | 91/391 R |
| 3,728,942 | 4/1973 | Brown, Jr. | 91/469 |
| 3,747,475 | 7/1973 | Runkle | 91/445 |
| 3,805,671 | 4/1974 | Carre | 91/391 R |
| 4,050,251 | 9/1977 | Carre et al. | 91/391 R X |
| 4,117,862 | 10/1978 | Qureshi | 137/596.13 |

FOREIGN PATENT DOCUMENTS 537029  6/1941  United Kingdom .................... 91/433

Primary Examiner—Irwin C. Cohen
Attorney, Agent, or Firm—Paul David Schoenle; Ken C. Decker

[57] ABSTRACT

The present invention relates to a hydraulic brake booster and a shuttle valve which is operable to limit the pressure communicated to a pressure chamber within the hydraulic brake booster. The shuttle valve is disposed within a control valve which is operator-actuated to communicate pressurized fluid to the pressure chamber so as to provide a power assist to braking via a piston responsive to pressurized fluid in the pressure chamber. The shuttle valve is exposed to the pressure chamber and movable relative to the control valve when the pressure in the pressure chamber is above a predetermined value in order to terminate or decrease communication of pressurized fluid to the pressure chamber. At the same time the shuttle valve cooperates with the control valve to reopen communication to an outlet as the control valve operates to close communication thereto during braking.

9 Claims, 2 Drawing Figures

PRESSURE LIMITER FOR HYDRAULIC BRAKE BOOSTER

BACKGROUND OF THE INVENTION

A hydraulic brake booster is coupled to a pressure source and is selectively actuated by an operator to provide a power assist to braking. The booster housing supports a piston which is movable in response to pressure in a pressure chamber and carries a control valve which is movable by an actuator to control fluid communication from the pressure source to the pressure chamber via an inlet and an outlet on the housing.

In order to control the amount, or the pressure level, of the pressurized fluid communicated to the pressure chamber, a pressure limiting device, such as illustrated in U.S. Pat. Nos. 3,724,332 and 3,728,942, is provided to relieve pressure in the pressure chamber when the pressure therein is above a predetermined value.

SUMMARY OF THE INVENTION

The present invention relates to an improvement in the foregoing hydraulic brake booster wherein the control valve of a hydraulic brake booster integrates a pressure limiting device. In particular, the control valve defines an axially extending passage for slidably receiving a shuttle valve which is responsive to the pressure within a pressure chamber to control communication of pressurized fluid to the latter. In addition, the shuttle valve cooperates with the control valve to provide for communication of pressurized fluid from an inlet to an outlet independently of the pressure chamber, but in response to the level of pressurized fluid in the pressure chamber.

It is an object of the present invention to incorporate a pressure limiting device into a control valve in a hydraulic brake booster.

It is a further object of the present invention to direct fluid communication to an outlet remote from a pressure chamber in a hydraulic brake booster when the pressure in the pressure chamber is above a predetermined value.

DETAILED DESCRIPTION

Figure 1:
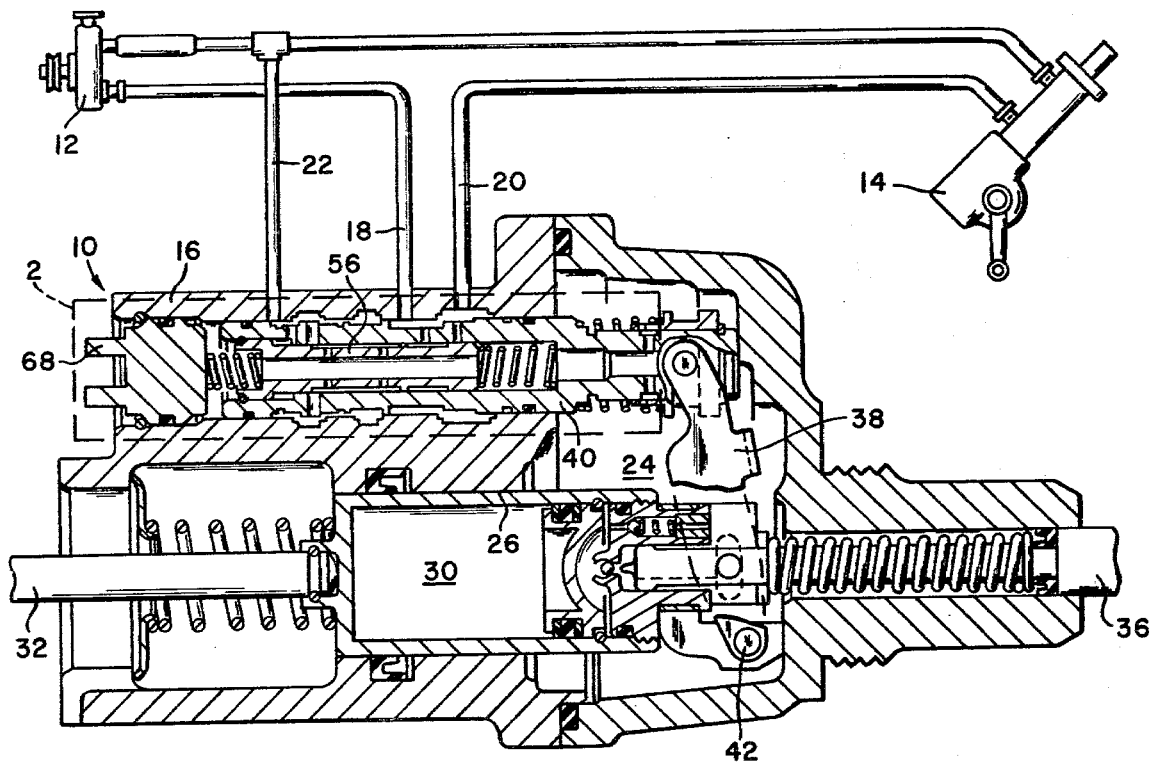
FIG. 1 is a schematic illustration of a vehicle hydraulic system with a hydraulic brake booster made according to the present invention illustrated in cross section.

In the hydraulic system of FIG. 1 a hydraulic brake booster 10 is in communication with a pressure source 12, such as a power steering pump, and provides for communicating the pressure source 12 to a steering gear 14. The booster 10 includes a housing 16 which forms an inlet 18, an outlet 20, and a return 22. A pressure chamber 24 is defined by the housing 16 and the latter also forms a first bore 26 and a second bore 28. A piston 30 disposed within the first bore 26 is movable in response to pressurized fluid in the pressure chamber 24 to actuate a conventional master cylinder (not shown) via rod 32.

For the purpose of activating the hydraulic brake booster 10, an input member 36 couples to a lever mechanism 38 and the latter pivotally couples to a control valve 40 which is movably received in the second bore 28. When the input member 36 is moved the lever mechanism pivots relative to the piston 30 via pin 42 to impart movement to the control valve 40. The control valve 40 cooperates with the inlet 18, the return 22, and the outlet 20 to communicate pressurized fluid from the inlet 18 to the pressure chamber 24 via an axial passage 50 extending through the control valve 40.

Figure 2:
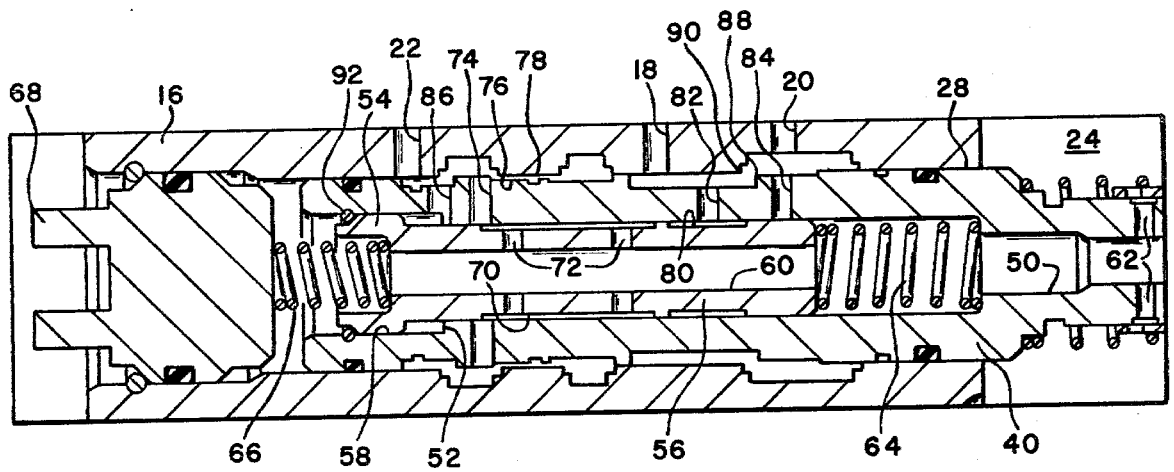
FIG. 2 is an enlarged, cross-sectional view of the encircled portion of FIG. 1.

In accordance with the invention the axial passage 50 is stepped to define a shoulder 52 and a shuttle valve 54 is disposed in the stepped passage 50, as seen more clearly in FIG. 2. The shuttle valve 54 includes a small diameter portion 56 and a large diameter portion 58. An axial opening 60 extends through the shuttle valve 54 so that the large diameter portion 58 and the small diameter portion 56 are exposed to the pressure within the pressure chamber 24 via an aperture 62 and the axial passage 50. A heavy spring at 64 extends between the control valve 40 and the shuttle valve 54 and a light spring at 66 extends between a housing plug 68 and the shuttle valve 54 such that the springs cooperate to center the shuttle valve 54 within the control valve 40.

When the control valve 40 is moved to the left, the shuttle valve 54 includes a recess 70 and a plurality of apertures 72 which cooperate with the aperture 74 on the control valve 40 such that pressurized fluid is communicated from the inlet 18 past metering lands 76 and 78 to the axial opening 60 and the axial passage 50 for communication with the pressure chamber 24. When the shuttle valve 54 is moved to the right, the shuttle valve 54 includes a second recess 80 which cooperates with a pair of apertures 82 and 84 on the control valve to provide for communication from the inlet 18 to the outlet 20 independently of the pressure chamber 24.

The position of the shuttle valve 54 within the control valve passage 50 is determined by the pressure level of the pressurized fluid in the pressure chamber 24, as the difference in diameters between portions 58 and 56 creates an area which is exposed to the pressure of the pressurized fluid in the pressure chamber. For example, the left enlarged diameter portion 58 creates a larger force than the right diameter portion 56 urging the shuttle valve 54 to move to the right as the same pressure opposes each portion 56 and 58. In order to permit movement of the shuttle valve 54 to the right, a hole 86 vents the portion of the passage 50 adjacent shoulder 52 and enclosed by the shuttle valve 54, to the return 22.

MODE OF OPERATION

During a normal braking cycle, the input member 36 is moved to the left to pivot the lever mechanism 38 counterclockwise about pin 42. The pivoting of the lever mechanism 38 causes the control valve 40 to move to the left within the second bore 28 to open communication between the inlet 18 and the axial opening 60 via the metering lands 76 and 78, the aperture 74, the recess 70 and the apertures 72 and 74. At the same time an edge 88 on the control valve approaches an edge 90 on the second bore 28 to reduce communication between the inlet 18 and the outlet 20. Consequently, pressurized fluid is diverted to the pressure chamber 24 in order to impart a force on the piston 30 so as to move the latter to actuate the master cylinder (not shown). If the pressure level of the pressurized fluid within the pressure chamber is maintained below a predetermined value, the resulting force acting on the shuttle valve 54 will not overcome the spring 64 so that the shuttle valve 54 will move with the control valve 40.

In the alternative as the pressure level in the pressure chamber exceeds a predetermined level, which is controlled by the difference in diameters between portions 56 and 58 and the spring constants for the springs 64 and 66, the force generated by the pressure acting against the large diameter portion 58, plus the force of spring 66 becomes large enough to overcome the force generated by the pressure acting against the small diameter portion 56 plus the force of spring 64, thereby imparting movement of the shuttle valve 54 to the right relative to the control valve. As the shuttle valve 54 moves to the right, the recess 70 separates from the aperture 74, thereby closing the latter, and the recess 80 opens aperture 82 to aperture 84. Consequently, communication of pressurized fluid to the opening 60 is cut off while communication of pressurized fluid from the inlet 18 to the outlet 20 is reestablished via aperture 82, recess 80 and aperture 84, even though the edges 88 and 90 reduce communication between the inlet 18 and outlet 20. When the pressure level of the pressure chamber 24 exceeds the predetermined value, the shuttle valve co-operates with the control valve to redirect pressurized fluid to the outlet so that no further communication of pressurized fluid to the pressure chamber takes place until the pressure level in the latter falls below the predetermined value, whereupon the spring 64 moves the shuttle valve to its normal position to provide for communication of pressurized fluid the the pressure chamber via apertures 74 and 72, opening 60, passage 50 and aperture 62.

A snap ring 92 limits movement of the shuttle valve 54 to the left and retains the latter within the control valve so that the control valve and shuttle valve form a unitary assembly for insertion into the second bore 28.

Although many modifications to the present invention are feasible by one skilled in the art, it is intended that these modifications fall within the scope of the appended claims.

I claim:

1. In a hydraulic brake booster having a housing defining a pressure chamber and slidably supporting a piston in a first bore which is movable in response to pressure in the pressure chamber, the housing having a second bore for supporting a control valve which is movable relative to the housing to control communication of pressurized fluid from an inlet to the pressure chamber, the improvement wherein the control valve defines a passage leading to the pressure chamber and said passage receives a shuttle valve, said shuttle valve being responsive to the pressure within the pressure chamber to move relative to the control valve to substantially limit communication of pressurized fluid from the inlet to the pressure chamber, said passage defining a stepped bore with a large diameter and a small diameter and said shuttle valve including a large diameter portion disposed within said large diameter and a small diameter portion disposed within said small diameter, and said shuttle valve defining an opening extending therethrough from said large diameter portion to said small diameter portion to communicate the fluid pressure within the small diameter acting against the small diameter portion to the large diameter.

2. In a hydraulic brake booster having a housing which defines a pressure chamber, a first bore movably supporting a piston and a second bore receiving a control valve, the control valve being movable from a normal position to a brake-applied position to communicate an inlet with the pressure chamber, the improvements in which the control valve defines a passage extending axially therethrough and a shuttle valve is disposed within the axial passage, said shuttle valve defining a differential area which is exposed to the pressure chamber to impart movement to said shuttle valve relative to the control valve when the pressure in the pressure chamber is above a predetermined value, said shuttle valve normally communicating the inlet with the pressure chamber during braking and said shuttle valve closing communication between the inlet and the pressure chamber when said shuttle valve is moved in response to the pressure in the pressure chamber being above the predetermined value.

3. The hydraulic brake booster of claim 2 in which the control valve passage is stepped and said shuttle valve forms a small diameter portion and a large diameter portion.

4. The hydraulic brake booster of claim 2 in which said shuttle valve is centered within the control valve passage by a first spring extending between the control valve and said shuttle valve and a second spring extending between said shuttle valve and the housing.

5. The hydraulic brake booster of claim 3 in which the control valve stepped passage defines a shoulder and said shoulder cooperates with said shuttle valve to form a variable volume cavity which communicates with a return on the housing.

6. In a hydraulic brake booster comprising a housing defining a pressure chamber and forming a first bore receiving a piston and a second bore receiving a control valve, the housing including an inlet and an outlet, the control valve being movable within the second bore to increase fluid communication between the inlet and the pressure chamber and decrease fluid communication between the inlet and the outlet, the improvement in which the control valve includes a shuttle valve, said shuttle valve being disposed within the control valve and cooperating therewith to define a differential area exposed to the pressure chamber and said shuttle valve moving relative to the control valve in response to pressure within the pressure chamber acting against said differential area to close communication between the inlet and the pressure chamber when the pressure within the pressure chamber is above a predetermined value.

7. In a hydraulic brake booster having a housing which substantially defines a pressure chamber, the housing also including a first bore movably receiving a piston and a second bore movably receiving a control valve, the control valve being movable relative to the housing to communicate pressurized fluid from an inlet to the pressure chamber so as to impart movement to the piston in response to the pressurized fluid in the pressure chamber, the improvement wherein the control valve supports means which is movable relative to said control valve so as to limit the communication of pressurized fluid to the pressure chamber, said means defining a differential area exposed to the pressurized fluid in said pressure chamber to impart a force to said means so as to move said means relative to said control valve, said means also cooperating with the control valve to define a first passage communicating the inlet with the pressure chamber during braking, and said means further movably cooperating with the control valve to reduce communication of pressurized fluid to the pressure chamber via said first passage responsive to said force when the pressure in said pressure chamber approaches a predetermined value.

8. The hydraulic brake booster of claim 7 in which said means cooperates with the control valve to define a secondary passage remote from said first passage, said means increasing communication of pressurized fluid from the inlet to an outlet via said secondary passage when the pressure in the pressure chamber approaches the predetermined value.

9. In a hydraulic brake booster having a housing defining a pressure chamber and supporting a piston in a first bore and a control valve in a second bore, the control valve cooperating with the housing second bore to communicate pressurized fluid from an inlet to the pressure chamber and the piston being movable in response to pressurized fluid in the pressure chamber, the improvement in which the control valve incorporates a shuttle valve to form a unitary assembly which is inserted in the second bore, said shuttle valve being movable in response to the pressurized fluid in the pressure chamber and cooperating with the control valve to limit the pressure level of the pressurized fluid in the pressure chamber to a predetermined valve, said shuttle valve cooperating with the control valve to define a passage normally communicating the inlet with the pressure chamber, and said shuttle valve closing said passage when the predetermined pressure level is reached, said shuttle valve including a small diameter portion and a large diameter portion which cooperate to form a differential area exposed to the pressure chamber, the fluid pressure within the pressure chamber acting against the differential area to bias the shuttle valve to a position closing said passage when the fluid pressure within the pressure chamber reaches a predetermined value.

* * * * *